No. 704,927. Patented July 15, 1902.
H. A. ROWLAND, Dec'd.
H. H. ROWLAND, Administratrix.
KEYBOARD FOR USE IN TELEGRAPHY.
(Application filed July 24, 1901.)

(No Model.) 6 Sheets—Sheet 1.

No. 704,927. Patented July 15, 1902.
H. A. ROWLAND, Dec'd.
H. H. ROWLAND, Administratrix.
KEYBOARD FOR USE IN TELEGRAPHY.
(Application filed July 24, 1901.)
(No Model.) 6 Sheets—Sheet 2.

Witnesses
Geo. H. Byrne
John H. Holt

Inventor:
H. H. Rowland
Admx. of the Estate of
H. A. Rowland deceased
By Wilkinson & Fisher
Attorneys

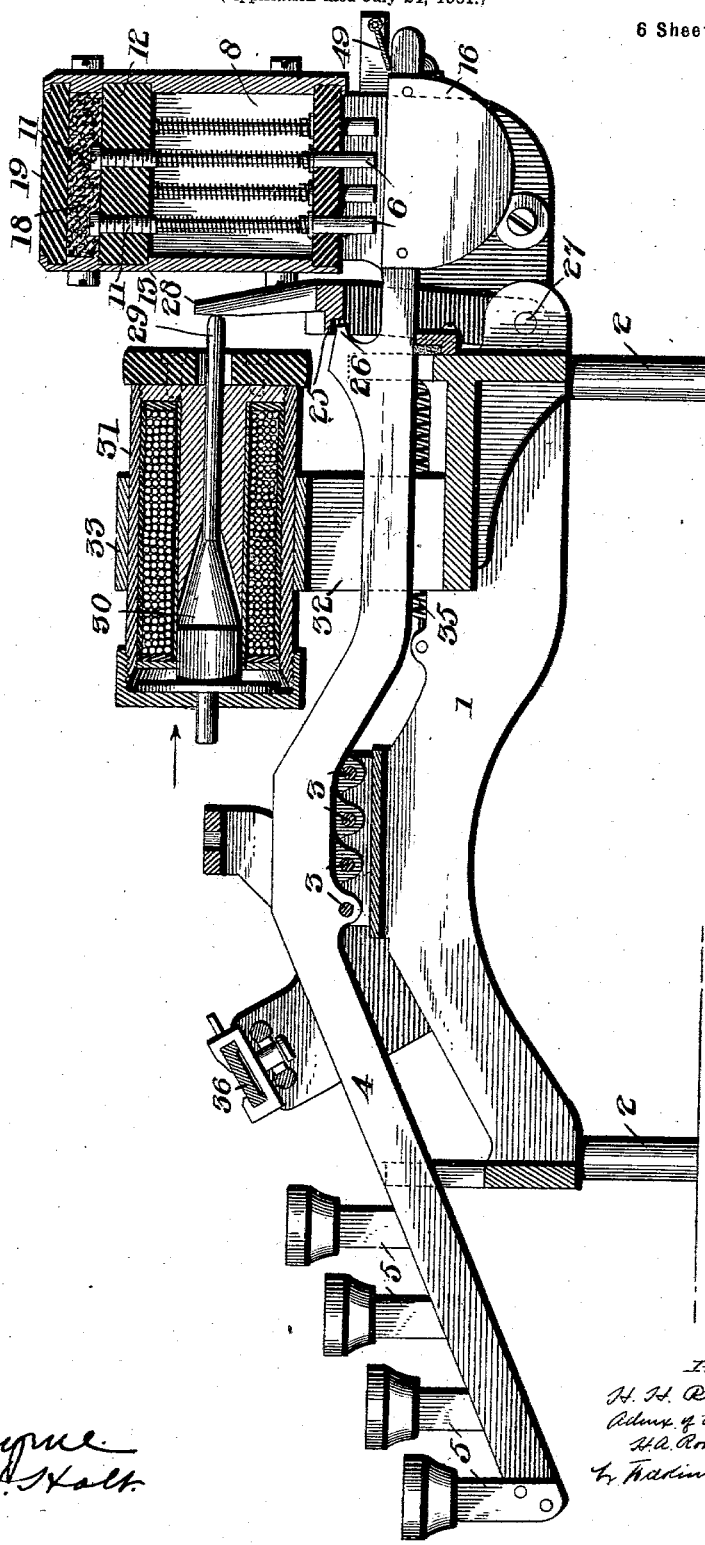

No. 704,927. Patented July 15, 1902.
H. A. ROWLAND, Dec'd.
H. H. ROWLAND, Administratrix.
KEYBOARD FOR USE IN TELEGRAPHY.
(Application filed July 24, 1901.)
(No Model.) 6 Sheets—Sheet 4.
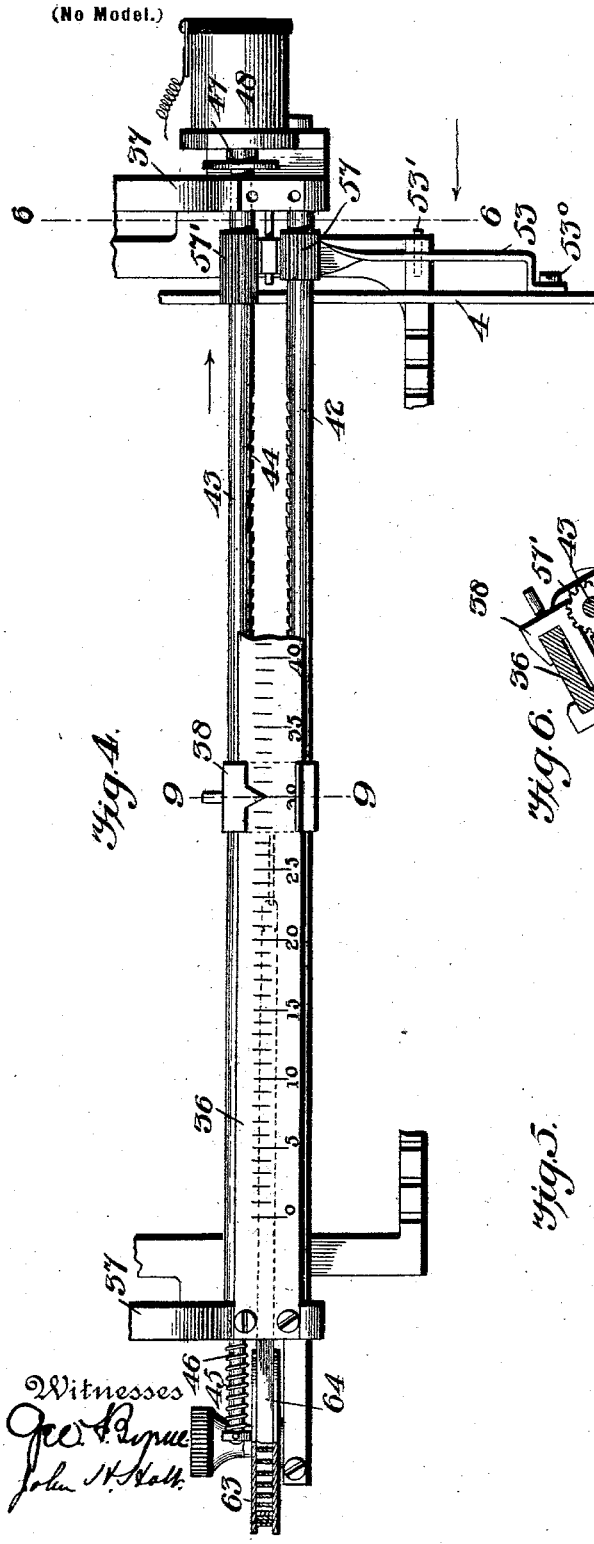
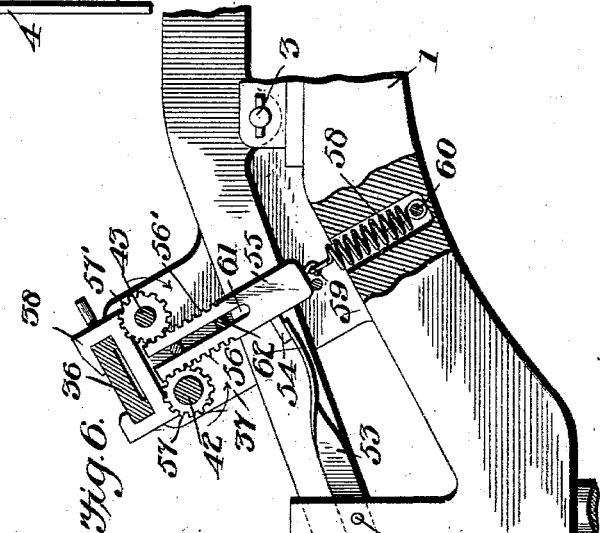
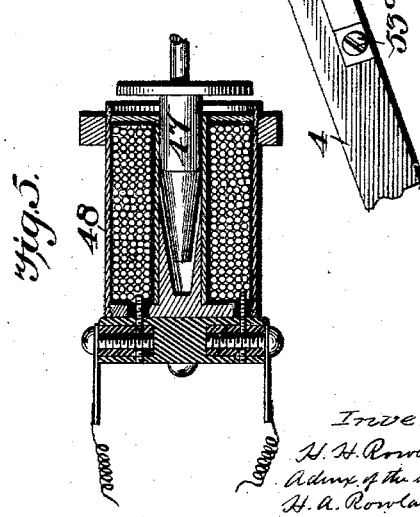
THE NORRIS PETERS CO., PHOTO-LITHO., WASHINGTON, D. C.

No. 704,927. Patented July 15, 1902.
H. A. ROWLAND, Dec'd.
H. H. ROWLAND, Administratrix.
KEYBOARD FOR USE IN TELEGRAPHY.
(Application filed July 24, 1901.)
(No Model.) 6 Sheets—Sheet 5.
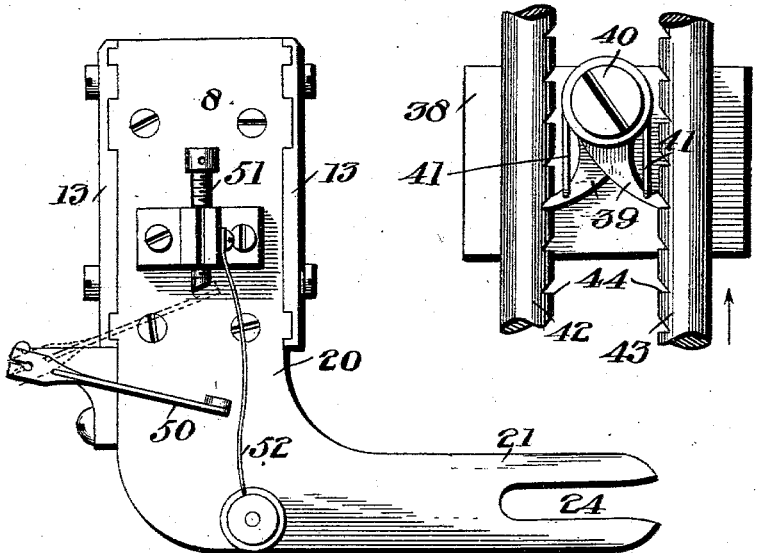
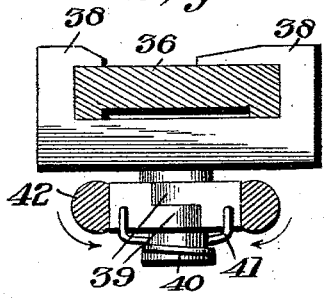
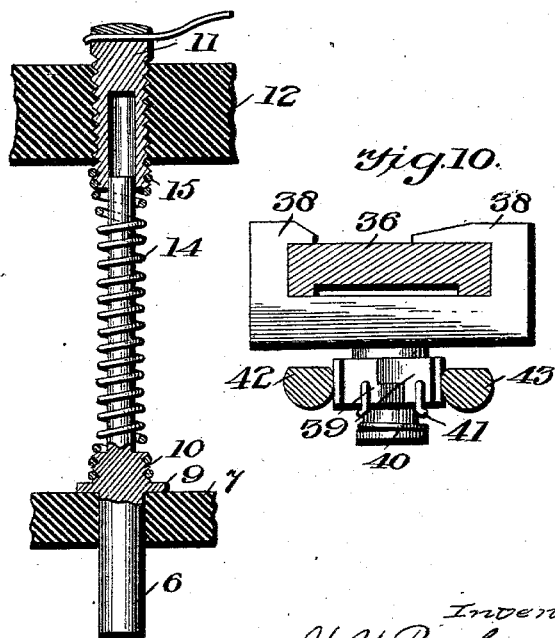

No. 704,927. Patented July 15, 1902.
H. A. ROWLAND, Dec'd.
H. H. ROWLAND, Administratrix.
KEYBOARD FOR USE IN TELEGRAPHY.
(Application filed July 24, 1901.)
(No Model.) 6 Sheets—Sheet 6.
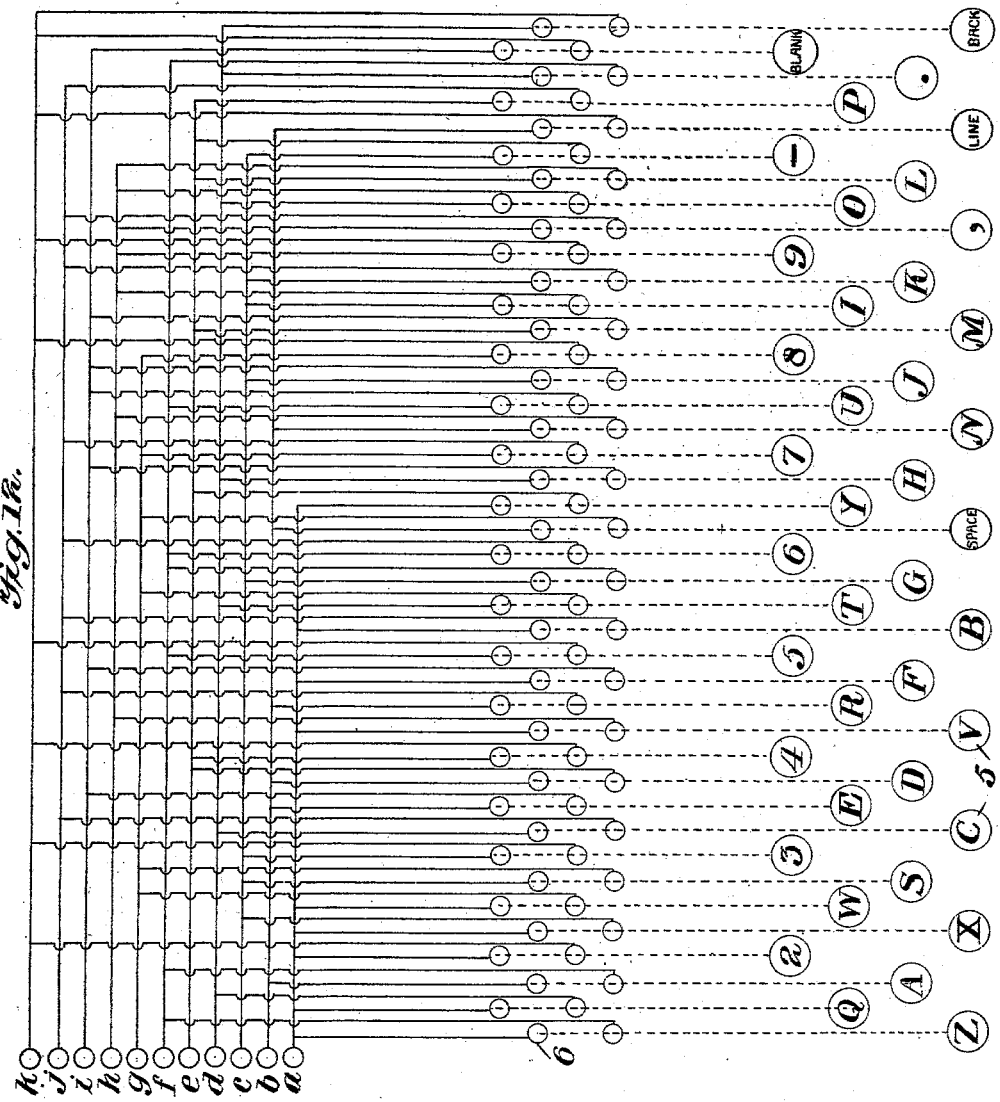

UNITED STATES PATENT OFFICE.

HENRIETTA H. ROWLAND, OF BALTIMORE, MARYLAND, ADMINISTRATRIX OF HENRY A. ROWLAND, DECEASED, ASSIGNOR TO ROWLAND TELEGRAPHIC COMPANY, OF BALTIMORE, MARYLAND, A CORPORATION OF NEW JERSEY.

KEYBOARD FOR USE IN TELEGRAPHY.

SPECIFICATION forming part of Letters Patent No. 704,927, dated July 15, 1902.

Application filed July 24, 1901. Serial No. 69,526. (No model.)

*To all whom it may concern:*

Be it known that HENRY A. ROWLAND, deceased, late a citizen of the United States, and a resident of Baltimore city, in the State of Maryland, did invent certain new and useful Improvements in Keyboards for Use in Telegraphy, (Case L,) of which the following is a full, clear, and exact specification, such as will enable any one skilled in the art to manufacture and use the same.

This invention relates to improvements in transmitting-keyboards for electric telegraphs, and is designed with special reference to those telegraphs in which keyboards are employed to operate upon the segment-circuits of local sunflower devices and to operate a main-line transmitting instrument for modifying the line-current in accordance with the code selected—such, for example, as shown and described in the patent to Henry A. Rowland for improvements in multiplex-printing telegraphs, No. 689,753, granted December 24, 1901.

The invention further comprises the novel combination and arrangement of parts hereinafter more fully described and claimed.

Figure 1:
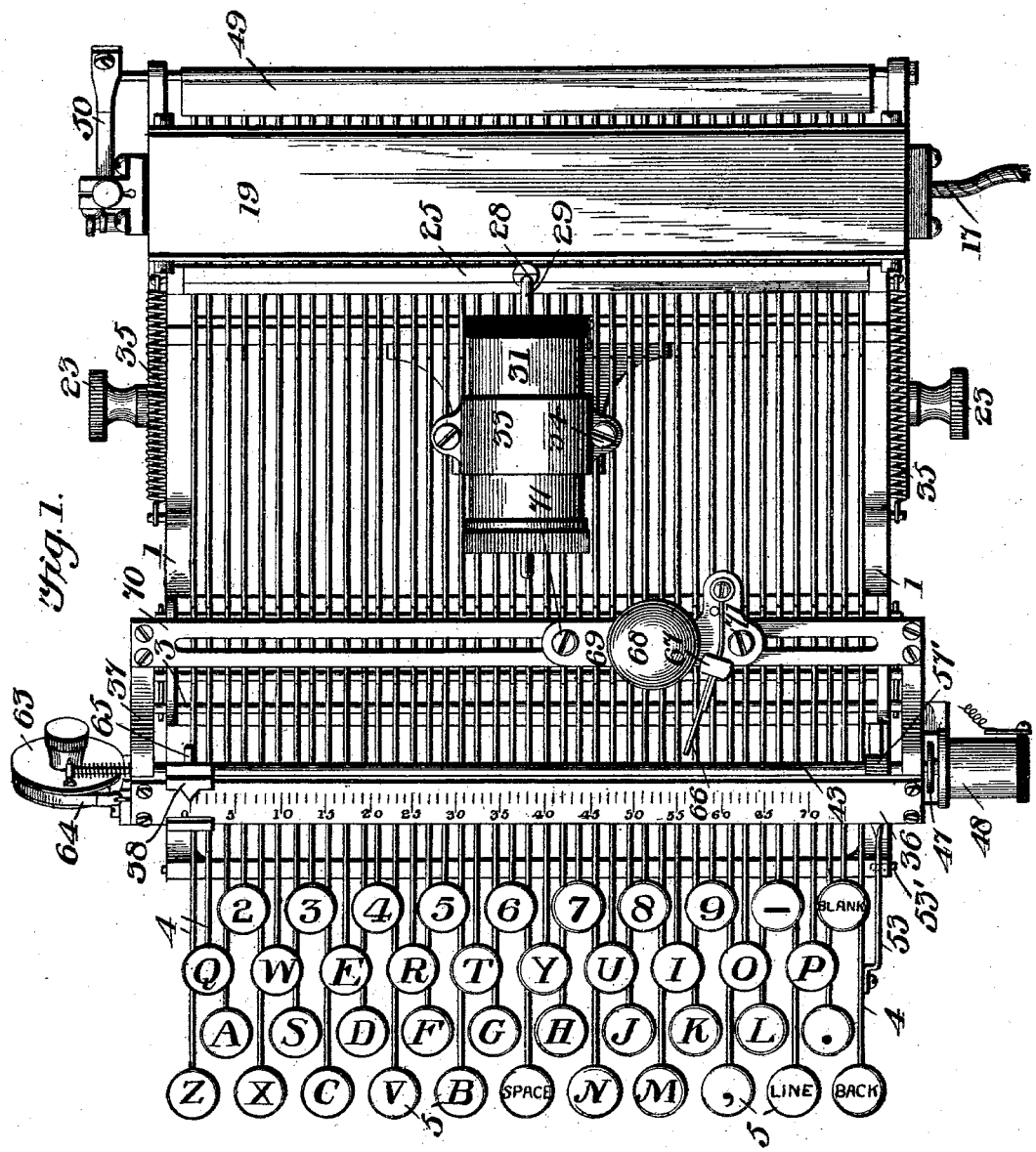
Figure 2:
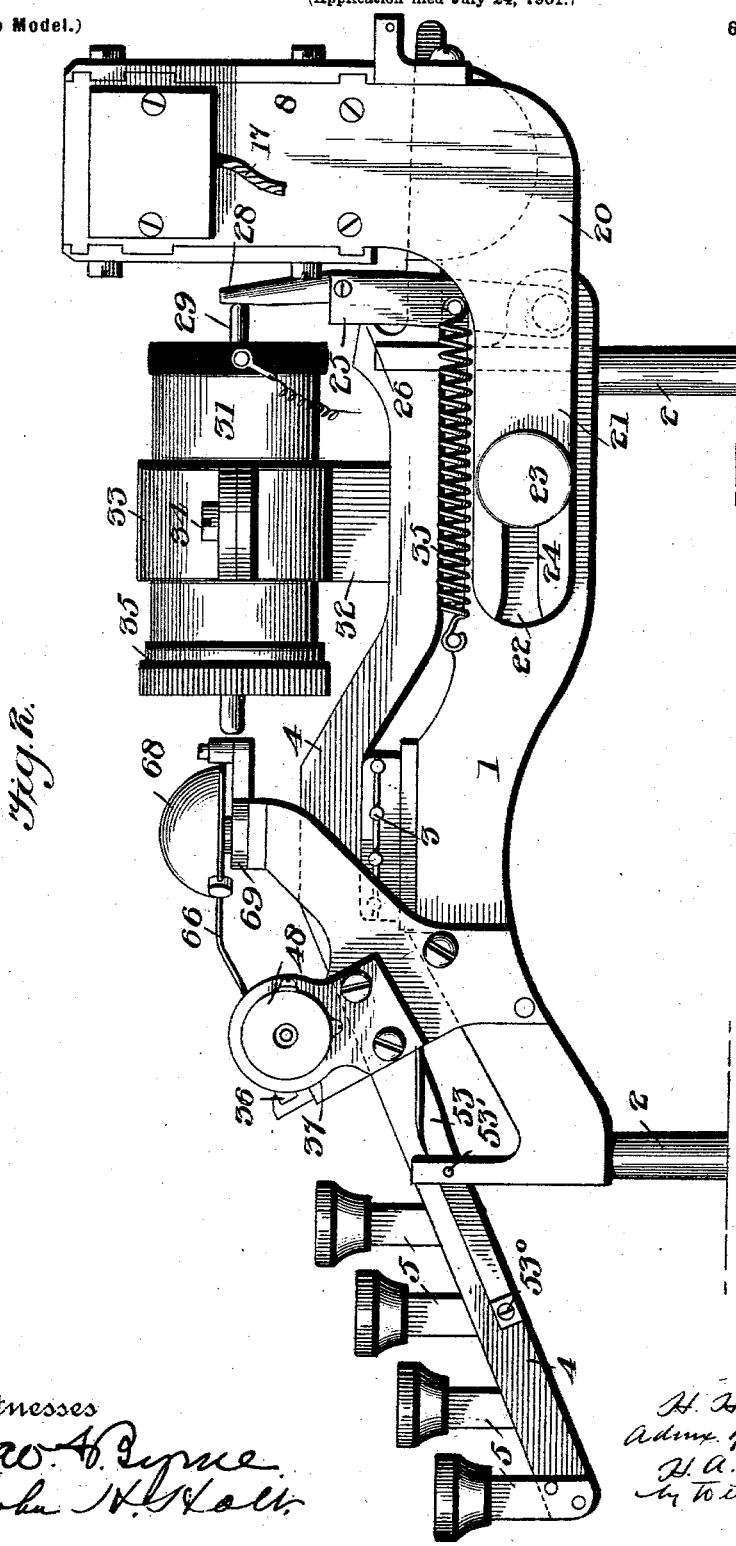

Referring to the accompanying drawings, which illustrate one form of the present invention, Figure 1 represents a top plan view of the keyboard. Fig. 2 represents a side elevation of the same; Fig. 3, a central vertical longitudinal section of the same. Fig. 4 is an enlarged top plan view of the counting mechanism with parts broken away. Fig. 5 is an enlarged central vertical longitudinal section of the counter-magnet. Fig. 6 is a section, partly in elevation, taken along the line 6 6 of Fig. 4 and looking in the direction of the arrow. Fig. 7 represents the bracket which carries the contact-makers in side elevation and detached from the keyboard. Fig. 8 is an enlarged detail view of the counting-indicator, showing the same in bottom plan and the manner in which it is carried by the shifting rods. Fig. 9 is an enlarged sectional view of the counting-indicator, taken along the line 9 9 of Fig. 4; and Fig. 10 is a similar view of the same with the shifting rods turned. Fig. 11 is an enlarged detail view, partly in section, of one of the pin contact-makers; and Fig. 12 is a diagram of the circuits, showing the manner of combining the same.

Similar parts are represented by similar numerals and letters throughout the several views.

1 represents the frame of a keyboard, which is preferably a light metal casting mounted upon suitable supports or legs 2. Extending across this frame are four rods 3, upon which are fulcrumed a plurality of key-levers 4, each of said levers being provided with a key 5, upon the upper face of which is inscribed the character or symbol which that key represents. These keys may obviously be fulcrumed in any other suitable manner. The function of each of these keys is when operated to complete a combination of electrical circuits and in this manner to transmit intelligence in various ways, as shown and described in the patent hereinbefore referred to. According to the keyboard described in the said application these circuits are combined mechanically for each key operated. In the present invention, however, the combinations are made electrically, and the function of the keys is simply to complete the electrical connection of the combinations already made. For this purpose there is located above the end of each of the said key-levers, opposite the end at which the keys are located, contact-pins 6, in this case two of said pins above each key-lever. These pins pass through apertures in an insulating-plate 7, forming the bottom of a box 8, extending across the keyboard and containing all the contact-pins. Each of these contact-pins is provided with a flange 9, which normally rests upon the plate 7, and just above this flange the pins are screw-threaded, as at 10, (see Fig. 11,) when they are reduced in diameter and extend upward into a chambered nut 11, which extends through a plate 12, of insulating material, held between the sides 13 of the box 8 and extending across the keyboard. A spring 14 is secured at its upper end, as at 15, to the lower end of the nut 11 and at its lower end to the screw-threaded portion 10 of the pin 6 and passes around the contact-pin between these points. This arrangement forms a good electrical connection between the nut 11 and the pin 6 and avoids soldering. In this way the spring 14, in addition to normally holding the contact-pin down upon the plate 7, acts to make a permanent electrical connection between the nut 11 and the contact-pin. Therefore it will be seen that each time a key is depressed its key-lever will be sent into contact with two of the pins 6 above it, the said pins rising for a slight distance after coming in contact with the key-lever in order to allow more perfect electrical connection than would be possible were the pins rigid.

Each key-lever is provided with a counterbalance-weight 16, which acts both to return the key to its normal position after operation and to insure more perfect contact with the pin 6, since this weight broadens that portion of the key-lever which comes in contact with the said pins.

The wires comprising the circuits to be combined by the keyboard pass into the box 8, preferably by a cable 17, and then into the upper portion of the said box 8, where they are connected to the nuts 11 of the contact-pins, as shown most clearly in Fig. 11. In the case illustrated in the drawings there are eleven of these wires which pass into the keyboard by the cable 17, which we may assume are eleven wires from the eleven segment-circuits of the transmitting-sunflower shown and described in the patent application above referred to. The manner in which these wires are connected and the combinations of circuits formed will be most clearly seen by referring to Fig. 12, where $a$, $b$, $c$, $d$, $e$, $f$, $g$, $h$, $i$, $j$, and $k$ represent the eleven circuits or wires which are connected to the contact-pins in the combinations indicated. These circuits $a$ to $k$, eleven in number, are connected to the contacts 6 in combinations of two in such manner that each key in making contact with two of the pins 6 will complete two of the circuits $a$ to $k$ and a different combination of each of these circuits for each key operated. In this manner from eleven circuits forty-one combinations of two circuits in each combination may be had, which enables us to employ forty-one keys upon the keyboard, being enough for the alphabet, numerals, and several other signs and signals hereinafter referred to. Thus, referring to the diagram Fig. 12, it will be seen that the operation of the key Z will form contact with the pins connected to wires which lead to circuits $a$ and $f$, and the operation of the key Q will form contact with the pins connected to wires which lead to the circuits $a$ and $d$, and so on through the whole series, the operation of each key making contact with two pins which are connected to two different wires of the series $a$ to $k$. The wires $a$ to $k$, leading into the box 8, are connected to the nuts 11, as described, and are embedded in the packing of suitable material 18—such as beeswax, resin, or the like—which is covered over by the insulating-plate 19. The insulating-plates 7, 12, and 19 slide in ways in the side members of the box 8 and may thus be readily removed by sliding them either to the right or left and the contacts thus easily reached.

The box 8 is provided with the end brackets 20, which extend rearwardly, as at 21, and are adapted to slide in the ways 22 in the side of the frame of the keyboard and are held in position by adjustable thumb-nuts 23, which pass through the slots 24 in the bracket. The bracket 20 may be thus easily removed from the keyboard-frame and the whole box containing the pin-contacts easily taken apart.

The clapper mechanism of the present keyboard, by which the keys may be operated only at fixed intervals, comprises, among other parts, the clapper-bar 25, extending across the keyboard above a row of lugs or overhanging lips 26, one of which is formed upon each key-lever. This clapper-bar 25 extends downwardly at each end and is pivoted in the frame of the keyboard, as shown at 27, and is provided at or near its center with an upwardly-extending tongue 28, which is normally in engagement with a pin 29, forming an extension of a plunger-core 30 of the iron-clad clapper-magnet 31. This clapper-magnet is rigidly mounted in the support 32, which is cast integral with the frame of the keyboard and passes upward above the key-levers, as shown. The magnet is held securely in this support by the cap 33, which is bolted to the support, as shown at 34. The clapper-bar is held in its normal position by springs 35, screwed to each side of the keyboard into the clapper-bar, as shown most clearly in Figs. 1 and 2. These springs hold the tongue 28 normally in engagement with the pin 29 of the clapper-magnet and force the plunger 30 in the position shown in Fig. 3 normally. When, however, an electric circuit is completed through the coils of the clapper-magnet, the said magnet sucks in its core in the direction of the arrow, Fig. 3, which sends the pin 29 forward and pushes the tongue 28 in the same direction, which removes the clapper-bar from engagement with the lugs 26 and allows the keys at this moment to be raised. Immediately, however, after the keys have been raised the clapper-magnet becomes demagnetized, when the clapper-bar will return to its normal position and will pass beneath the lug 26 of the keys which have been operated and hold them in the operated position until the clapper-bar is again moved, when the key-levers will return to their normal position. In this manner all the keys are locked from operation except at certain periods and after being operated are locked in the operative position until the next keys are operated.

36 represents a scale extending across the keyboard in front of the keys and secured at each end to the uprights 37 of the keyboard-frame. The object of this scale is to indicate the position upon the line that the character last transmitted occupies, being especially applicable to cases in which the keyboard is used in connection with a telegraphic page-printer—such as that, for example, shown and described in the patent application to Henry A. Rowland, Serial No. 19,070, filed June 14, 1900, or as described in the patent to Henry A. Rowland, No. 689,754, granted December 24, 1901. For this purpose the scale is provided with an indicator 38, which slides upon it from right to left, and the position of this indicator enables the operator of the keyboard to tell at once the exact position upon the line of the last signal transmitted. To accomplish this, the indicator is adapted to travel one space upon the scale for each of the keys operated which transmit characters or symbols, as some of the keys are used for other purposes. This indicator 38 engages all four sides of the scale-bar 36 and is provided with two spring-actuated pawls 39, pivotally mounted upon a screw 40, passing into the back of the indicator 38. These pawls 39 are normally held by the spring 41 in engagement with the shifting rods 42 and 43, (see Figs. 8, 9, and 10,) which are provided with oppositely-disposed teeth 44, into which the said pawls extend. The rod 43 is journaled loosely at its ends in the uprights 37 and is capable of revolving in said uprights and at the same time of longitudinal movement therein. This rod 43 is held in its normal longitudinal position by the coil-spring 45 upon its end 46. The other end of this rod 43 terminates in a plunger 47 of the counter-magnet 48, so that each time the coils of this magnet are energized and it sucks in its core 47 the rod 43 will be shifted in the direction of the arrow, Fig. 4, to a certain extent and quickly returned to its original position upon the demagnetization of the magnet 48 and will in this way cause the said indicator 38 to advance a space upon the scale, owing to the fact that the pawls of the said indicator engage the teeth of the rods 42 and 43, and the said pawls being oppositely disposed one acts to advance the indicator when the rod 43 is pulled forward, and the other—that is, the one engaging the teeth of the rod 42—acts to hold the indicator in the position to which it is brought, while the rod 43 returns to its normal position. In this manner each time the magnet 48 is energized the indicator 38 advances one space upon the scale, and thus indicates the position of the character upon the line. The magnet 48 is thus energized each time one of the keys transmitting a character or other signal is operated by locating above the ends of the keys a hinged plate 49, which carries a contact-arm 50. Each time that one of the keys is operated it raises this contact-plate 49 and its contact-arm 50 and causes the latter to make electrical connection with a contact-screw 51, (see Fig. 7,) which is connected electrically to a wire 52, leading from a source of current to the counter-magnet 48. The indicator 38 having advanced across the scale is returned to its initial position or back to the zero-mark on the scale by operating the key indicated "Back." This key is provided with an arm 53, which engages a lug 54, carried by a rack-bar 55, having teeth upon two of its faces 56 and 56'. The teeth 56 of this rack-bar engage a small pinion 57, carried by the rod 42, while the teeth 56' of the rack-bar engage a pinion 57', carried by the rod 43, and this bar 55 is normally pulled downward by spring 58 engaging a hook 59 on the lower end of the bar and passing into the frame of the keyboard, as shown, and connected at its lower end to a pin 60. This bar 55 is slotted, as at 61, where it engages two pins 62, by which it is guided. The arm 53 is pivoted in the frame of the keyboard, as at 53', and is pivoted to the key-lever, as at 53⁰, so that when the key-lever is depressed the end of the arm 53, engaging a lug 54, will be raised. Therefore when the key-lever to which the arm 53 is secured is operated the end of the arm 53 will pass upward, carrying the rack-bar 55 upward against the tension of the spring 58, which will rotate the pinions 57 and 57' in the direction indicated by the arrows, which will accordingly rotate the rods 42 and 43 in corresponding directions and in this manner throw the teeth of the said rods out of engagement with the pawls of the indicator 38. The indicator will then be free to slide in either direction upon the scale. It is, however, at such times returned to the zero position on the scale by the spring-wheel 63, which is provided with a strap or equivalent device 64, which passes around said spring-wheel and connects to the indicator, as shown in dotted lines in Fig. 4. When the key marked "Back" is released, the rack-bar 55 will resume its normal position and rotate the rods 42 and 43 accordingly until their teeth again engage the pawls of the indicator, when the said indicator will again be in position to advance step by step over the scale, as described. The magnet 48, by which this indicator is operated, is shown enlarged in section in Fig. 5 and is of the iron-clad pot-magnet type, substantially as fully described and shown in the patent application, Serial No. 19,070, above referred to.

In order to indicate to the operator that the indicator is approaching the end of the line, the said indicator is provided with a lug 65, which engages a spring-arm 66, carrying a striker 67, adapted to strike a bell 68, mounted upon a base 69, adapted to slide upon a slotted bar 70 and extending across the keyboard, as shown. The position of this bell may be varied by adjusting the screws 71, when the bell may be slid along the bar 70 until the desired point is reached, when the screw 71 may again be tightened and the bell fixed in the desired position.

The keys indicated "Blank," "Space," "Line," and "Black" are used upon the present keyboard for the purpose of operating the blank-paper-feed mechanism, the spacing mechanism, the lining mechanism, and the carriage-return mechanism of a page-printing machine, such as that described in the patent application, Serial No. 19,070, above referred to. Any characters, however, may be substituted for those shown upon the keys of the present keyboard.

Having thus described the invention, it is obvious that may changes and modifications may be made in the construction of the same without departing from the spirit of the invention; but

What is claimed, and desired to be secured by Letters Patent of the United States, is—

1. In a transmitting-keyboard for electric telegraphs, the combination with a group of conductors leading into said keyboard, a series of electrical contacts of greater number than said conductors, said contacts electrically connected to said conductors in prearranged combinations, and means operating in conjunction with said contacts for operating circuits through said conductors and contacts.

2. In a transmitting-keyboard for electric telegraphs, the combination with a group of conductors leading into said keyboard, a series of electrical contacts of greater number than said conductors, permanent electrical connection between said contacts and said conductors by which said contacts and conductors are connected in prearranged combinations, and means for operating circuits through said conductors and sets of said contacts.

3. In a transmitting-keyboard for electric telegraphs, the combination with a group of conductors leading into said keyboard, a series of electrical contacts of greater number than said conductors, permanent electrical connection between said contacts and said conductors by which said contacts and conductors are connected in prearranged combinations, and means comprising a plurality of keys for operating circuits through said conductors and sets of said contacts.

4. In a transmitting-keyboard for electric telegraphs, the combination with a group of conductors leading into said keyboard, a series of fixed electrical contacts of greater number than said conductors, a series of movable contacts adapted to engage said fixed contacts and in permanent electrical connection therewith, permanent electrical connection between said fixed contacts and said conductors by which said contacts and conductors are connected in prearranged combinations, and means comprising a plurality of keys for making and breaking circuits from said conductors through sets of said contacts.

5. In a transmitting-keyboard, a series of rigid electrical contacts, a series of electrical conductors permanently connected to said contacts in combinations, a series of movable contacts comprising a series of pins, one of said pins adapted to reciprocate in each of said rigid contacts and permanently electrically connected thereto, a series of key-levers, each adapted when operated to engage a combination of said movable contacts, substantially as described.

6. In a transmitting-keyboard, a series of electrical contacts and a series of electrical conductors permanently connected to said contacts in combinations, an insulating-plate in which said contacts are rigidly mounted and through which they pass, a plate of insulating material mounted below said contacts, a series of contact-pins passing through said plate and adapted to reciprocate therein, each of said pins having an elongated stem adapted to reciprocate in one of said rigid contacts, a coil-spring surrounding the said portion of each of said pins and permanently connected electrically at its upper end to the rigid contact and at its lower end to the reciprocating pin-contact, and a series of key-levers each adapted to engage when operated a combination of said reciprocating contacts, substantially as described.

7. In a transmitting-keyboard, the combination with the key-levers, of the clapper-locking mechanism, comprising a pivoted rocking clapper-bar extending across the tops of the said key-levers, a series of lugs one upon each key-lever, adapted to be engaged by said clapper-bar, an upwardly-projecting tongue carried by said clapper-bar, a magnet-plunger normally abutting against said tongue, an iron-clad magnet into which said plunger is adapted to be drawn, springs connected to the clapper-bar and normally forcing the tongue of said clapper-bar against the plunger of said magnet, and tending to force the plunger out of said magnet, and a frame in which said magnet is rigidly mounted, substantially as described.

8. In a transmitting-keyboard, the combination with the keys and key-levers, of the counting mechanism comprising a scale, an indicator mounted to travel on said scale, an electromagnet, an auxiliary contact-maker completing a circuit through said magnet upon the operation of said keys and causing the said indicator to be advanced step by step over said scale, and means operated by one of said keys for returning said indicator to the initial position, substantially as described.

9. In a transmitting-keyboard, the combination with the keys and key-levers, of the counting mechanism, comprising a scale, an indicator mounted to travel over said scale, ratchets carried by said indicator, shifting rods adapted to be engaged by said ratchet, means for imparting longitudinal movement to one of said shifting rods, whereby step-by-step longitudinal movement is imparted to said indicator, and means for returning the indicator to its initial position by the rotation of said shifting rods.

10. In a transmitting-keyboard, the combination with the keys and key-levers, of a counting mechanism, comprising a scale, and an indicator mounted to travel over said scale, a pair of parallel shifting rods, extending longitudinally of said scale and each capable of rotation around its longitudinal axis, oppositely-disposed ratchets carried by said indicator, each one of said ratchets engaging one of said ratchet-rods, means for reciprocating one of said rods longitudinally, whereby step-by-step movement is imparted to said indicator, and means for rotating said shifting rods whereby the teeth thereof are disengaged from the pawls of said indicator, and means for returning said indicator to its initial position when its ratchets are thus disengaged from the teeth of said rods, substantially as described.

11. In a transmitting-keyboard, the combination with the keys and key-levers, of the counting mechanism, comprising a scale and an indicator mounted to travel over said scale, a pair of parallel shifting rods extending longitudinally of said scale and each capable of rotation around its longitudinal axis, oppositely-disposed ratchets carried by said indicator, each one of said ratchets engaging one of said shifting rods, a magnet-plunger connected to the end of one of said ratchets for reciprocating said rod, whereby step-by-step motion is imparted to said indicator, an electromagnet into which said plunger is adapted to operate, an auxiliary contact-maker adapted to complete the electric circuit through said magnet upon the operation of each of a series of the said keys, and means for rotating said shifting rods whereby the teeth thereof are disengaged from the pawls of said indicator, and means for returning said indicator to its initial position when its ratchets are thus disengaged from the teeth of said rods, substantially as described.

12. In a transmitting-keyboard, the combination with the keys and key-levers, of the counting mechanism, comprising a scale and an indicator mounted to travel over said scale, a pair of parallel shifting rods extending longitudinally of said scale and each capable of rotation around its longitudinal axis, oppositely-disposed ratchets carried by said indicator, each one of said ratchets engaging one of said shifting rods, means for reciprocating one of said bars whereby step-by-step motion is imparted to said indicator, a pinion mounted on each of said shifting rods, a rack engaging said pinions, operative connection between one of said key-levers and said rack, whereby the operation of said key-lever shifts said rack and rotates said shifting rods, thereby disengaging the teeth thereof from said ratchets, a spring-actuated wheel and flexible connection from said wheel to said indicator whereby said indicator is returned to its initial position after the disengagement of said ratchets with said teeth, substantially as described.

13. In a transmitting-keyboard, the combination with the keys and key-levers, of the counting mechanism, comprising a scale and an indicator mounted to travel over said scale, a pair of parallel shifting rods extending longitudinally of said scale, and each capable of rotation around its longitudinal axis, oppositely-disposed ratchets carried by said indicator, each one of said ratchets engaging one of said shifting rods, a magnet-plunger connected to the end of one of said shifting rods for reciprocating the same, whereby step-by-step motion is imparted to said indicator, an iron-clad electromagnet into which said plunger is adapted to pass, an auxiliary contact-maker adapted to complete the electric circuit through said magnet upon the operation of each of a series of the said keys, and means for rotating said shifting rods whereby the teeth thereof are disengaged from the pawls of said indicator and means for returning said indicator to its initial position when its ratchets are thus disengaged from the teeth of said rods, substantially as described.

14. In a transmitting-keyboard, the following instrumentalities, viz: a series of key-levers, and keys carried thereby, a series of reciprocating electrical contacts, a series of electrical conductors connected to said contacts in combinations, combinations of said reciprocating contacts adapted to be engaged by said key-levers upon their operation, the clapper-locking mechanism and clapper-magnet operating the same, and the counting mechanism, substantially as described.

In testimony whereof I affix my signature.

HENRIETTA H. ROWLAND,
Administratrix of the estate of Henry A. Rowland, deceased.

In presence of—
J. H. KNOWLES,
ANNIE MCFARLAND.